United States Patent
Ortman et al.

(10) Patent No.: US 12,012,094 B2
(45) Date of Patent: Jun. 18, 2024

(54) DETECTING VEHICLE PRESENCE AT A SITE

(71) Applicant: Ford Global Technologies, LLC, Dearborn, MI (US)

(72) Inventors: Richard Ortman, Saline, MI (US); Krishna Bandi, Farmington Hills, MI (US); Esrafil Jedari, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 332 days.

(21) Appl. No.: 17/113,143

(22) Filed: Dec. 7, 2020

(65) Prior Publication Data

US 2022/0176943 A1 Jun. 9, 2022

(51) Int. Cl.
| | |
|---|---|
| *B60W 30/00* | (2006.01) |
| *B60W 10/18* | (2012.01) |
| *B60W 10/20* | (2006.01) |
| *G01C 21/28* | (2006.01) |

(52) U.S. Cl.
CPC ........... *B60W 30/00* (2013.01); *B60W 10/18* (2013.01); *B60W 10/20* (2013.01); *G01C 21/28* (2013.01); *B60W 2556/50* (2020.02)

(58) Field of Classification Search
CPC ...... B60W 30/00; B60W 10/18; B60W 10/20; B60W 2556/50; B60W 30/10; B60W 30/14; B60W 40/02; B60W 2520/06; B60W 2520/10; B60W 2520/105; G01C 21/28
USPC ........................................................ 701/41
See application file for complete search history.

(56) References Cited

U.S. PATENT DOCUMENTS

| | | | | |
|---|---|---|---|---|
| 5,610,815 A * | 3/1997 | Gudat | ..................... | G08G 1/202 73/178 R |
| 6,615,132 B1 * | 9/2003 | Nagasaka | ............... | E05F 15/77 340/988 |
| 7,127,413 B1 * | 10/2006 | Yanagisawa | ........... | G07B 15/02 705/13 |
| 8,140,358 B1 * | 3/2012 | Ling | ...................... | G07C 5/008 340/439 |
| 8,762,850 B2 * | 6/2014 | Matz | .................. | H04N 21/4532 715/745 |
| 9,092,535 B1 * | 7/2015 | Gough | ................. | G06Q 10/107 |
| 9,418,491 B2 * | 8/2016 | Phillips | ................... | B60R 25/25 |
| 9,568,322 B2 * | 2/2017 | Sugihara | ................. | E21C 41/00 |
| 10,060,175 B1 * | 8/2018 | Lickfelt | ................. | E05F 15/77 |
| 10,354,535 B1 * | 7/2019 | Bonawitz | ............. | G08G 5/0017 |
| 10,493,996 B2 * | 12/2019 | Phillips | ............... | G07C 5/0808 |
| 10,510,193 B2 * | 12/2019 | Wells | ..................... | H04W 4/021 |
| 10,657,768 B2 * | 5/2020 | Northrup | ........... | G06Q 30/0238 |
| 10,761,525 B2 * | 9/2020 | Bethke | ................. | G08G 5/0086 |

(Continued)

FOREIGN PATENT DOCUMENTS

| | | |
|---|---|---|
| KR | 20120134435 A | 12/2012 |
| WO | 2019172009 A1 | 9/2019 |

*Primary Examiner* — Hunter B Lonsberry
*Assistant Examiner* — Robert Louis Pinkerton
(74) *Attorney, Agent, or Firm* — Frank A. MacKenzie; Bejin Bieneman PLC

(57) ABSTRACT

A computer includes a processor and a memory storing instructions executable by the processor to determine that a vehicle is present at a site based on a comparison of sequentially received values for a plurality of parameters related to the vehicle with an ordered sequence of ranges for the parameters, and perform an operation upon determining that the vehicle is present at the site.

20 Claims, 6 Drawing Sheets

(56) References Cited

U.S. PATENT DOCUMENTS

| | | | |
|---|---|---|---|
| 10,762,795 B2* | 9/2020 | Contreras | G05D 1/0061 |
| 11,086,334 B2* | 8/2021 | Fridman | G06T 11/60 |
| 11,157,346 B2* | 10/2021 | Raghavan | G06N 20/00 |
| 11,341,961 B2* | 5/2022 | Lu | G10L 15/187 |
| 11,526,836 B2* | 12/2022 | Liu | G01C 21/343 |
| 11,550,968 B2* | 1/2023 | Huang | G06F 30/17 |
| 2004/0034465 A1* | 2/2004 | Spiesberger | G01V 1/28 |
| | | | 702/150 |
| 2007/0021907 A1 | 1/2007 | Kato et al. | |
| 2009/0146846 A1* | 6/2009 | Grossman | G08B 29/22 |
| | | | 340/988 |
| 2012/0134435 A1* | 5/2012 | Kapoor | H01Q 3/2611 |
| | | | 375/267 |
| 2015/0322911 A1* | 11/2015 | Schweiger | F02N 11/0837 |
| | | | 701/112 |
| 2016/0052471 A1* | 2/2016 | Pietsch | B60R 16/037 |
| | | | 701/29.1 |
| 2017/0080951 A1* | 3/2017 | Grossman | G06F 3/0488 |
| 2017/0105265 A1* | 4/2017 | Sadwick | H05B 47/11 |
| 2017/0300049 A1* | 10/2017 | Seally | H04W 4/024 |
| 2018/0035606 A1* | 2/2018 | Burdoucci | H04N 5/232935 |
| 2018/0167796 A1* | 6/2018 | Raje | H04W 4/023 |
| 2019/0232958 A1* | 8/2019 | Deng | B60T 7/22 |
| 2020/0062243 A1* | 2/2020 | Perez Barrera | G05D 1/028 |
| 2020/0172112 A1* | 6/2020 | Kawashima | G06Q 30/0278 |
| 2020/0327804 A1* | 10/2020 | Xu | G08G 1/095 |
| 2021/0046977 A1* | 2/2021 | Zhang | B60W 10/20 |
| 2021/0139007 A1* | 5/2021 | Wijffels | G05D 1/0891 |
| 2021/0374435 A1* | 12/2021 | Schwartz | G01C 21/3815 |
| 2022/0178715 A1* | 6/2022 | Golgiri | G01C 21/3811 |
| 2022/0395226 A1* | 12/2022 | Lovoi | A61B 5/6803 |

\* cited by examiner

| Parameter | | | | | | |
|---|---|---|---|---|---|---|
| 126 — Position | $[X_1, Y_1]$ | $[X_2, Y_2]$ | $[X_3, Y_3]$ | $[X_4, Y_4]$ | $[X_5, Y_5]$ | ⋮ |
| 130 — Speed | $[V_{hi1}, V_{lo1}]$ | $[V_{hi2}, V_{lo2}]$ | $[V_{hi3}, V_{lo3}]$ | $[V_{hi4}, V_{lo4}]$ | $[V_{hi5}, V_{lo5}]$ | ⋮ |
| 132 — Acceleration | $[A_{hi1}, A_{lo1}]$ | $[A_{hi2}, A_{lo2}]$ | $[A_{hi3}, A_{lo3}]$ | $[A_{hi4}, A_{lo4}]$ | $[A_{hi5}, A_{lo5}]$ | ⋮ |
| 134 — Heading | $[\psi_{hi1}, \psi_{lo1}]$ | $[\psi_{hi2}, \psi_{lo2}]$ | $[\psi_{hi3}, \psi_{lo3}]$ | $[\psi_{hi4}, \psi_{lo4}]$ | $[\psi_{hi5}, \psi_{lo5}]$ | ⋮ |
| 135 — Yaw Rate | $[\omega_{hi1}, \omega_{lo1}]$ | $[\omega_{hi2}, \omega_{lo2}]$ | $[\omega_{hi3}, \omega_{lo3}]$ | $[\omega_{hi4}, \omega_{lo4}]$ | $[\omega_{hi5}, \omega_{lo5}]$ | ⋮ |
| 138 — Brake application | $[B_{hi1}, B_{lo1}]$ | $[B_{hi2}, B_{lo2}]$ | $[B_{hi3}, B_{lo3}]$ | $[B_{hi4}, B_{lo4}]$ | $[B_{hi5}, B_{lo5}]$ | ⋮ |
| 140 — Steering Angle | $[\theta_{hi1}, \theta_{lo1}]$ | $[\theta_{hi2}, \theta_{lo2}]$ | $[\theta_{hi3}, \theta_{lo3}]$ | $[\theta_{hi4}, \theta_{lo4}]$ | $[\theta_{hi5}, \theta_{lo5}]$ | ⋮ |
| 142 — Steering-Wheel Angle | $[\phi_{hi1}, \phi_{lo1}]$ | $[\phi_{hi2}, \phi_{lo2}]$ | $[\phi_{hi3}, \phi_{lo3}]$ | $[\phi_{hi4}, \phi_{lo4}]$ | $[\phi_{hi5}, \phi_{lo5}]$ | ⋮ |
| 143 — Accelerator pedal | $[k_{hi1}, k_{lo1}]$ | $[k_{hi2}, k_{lo2}]$ | $[k_{hi3}, k_{lo3}]$ | $[k_{hi4}, k_{lo4}]$ | $[k_{hi5}, k_{lo5}]$ | ⋮ |
| 146 — FFT bin 1 | $[P_{1hi1}, P_{1lo1}]$ | $[P_{1hi2}, P_{1lo2}]$ | $[P_{1hi3}, P_{1lo3}]$ | $[P_{1hi4}, P_{1lo4}]$ | $[P_{1hi5}, P_{1lo5}]$ | ⋮ |
| FFT bin 2 | $[P_{2hi1}, P_{2lo1}]$ | $[P_{2hi2}, P_{2lo2}]$ | $[P_{2hi3}, P_{2lo3}]$ | $[P_{2hi4}, P_{2lo4}]$ | $[P_{2hi5}, P_{2lo5}]$ | ⋮ |
| ⋮ | ⋮ | ⋮ | ⋮ | ⋮ | ⋮ | ⋮ |
| 148 — RSS | $[S_{hi1}, S_{lo1}]$ | $[S_{hi2}, S_{lo2}]$ | $[S_{hi3}, S_{lo3}]$ | $[S_{hi4}, S_{lo4}]$ | $[S_{hi5}, S_{lo5}]$ | ⋮ |

FIG. 3A

| 108 — Parameter | | 150 | | | 110 ↙ |
|---|---|---|---|---|---|
| 126 — Position | $[X_1, Y_1]$ | $[X_2, Y_2]$ | $[X_3, Y_3]$ | $[X_4, Y_4]$ | $[X_5, Y_5]$ |
| 130 — Speed | $[V_{hi1}, V_{lo1}]$ | $[V_{hi2}, V_{lo2}]$ | $[V_{hi3}, V_{lo3}]$ | $[V_{hi4}, V_{lo4}]$ | $[V_{hi5}, V_{lo5}]$ |
| 132 — Acceleration | $[A_{hi1}, A_{lo1}]$ | $[A_{hi2}, A_{lo2}]$ | $[A_{hi3}, A_{lo3}]$ | $[A_{hi4}, A_{lo4}]$ | $[A_{hi5}, A_{lo5}]$ |
| 134 — Heading | $[\psi_{hi1}, \psi_{lo1}]$ | $[\psi_{hi2}, \psi_{lo2}]$ | $[\psi_{hi3}, \psi_{lo3}]$ | $[\psi_{hi4}, \psi_{lo4}]$ | $[\psi_{hi5}, \psi_{lo5}]$ |
| 135 — Yaw Rate | $[\omega_{hi1}, \omega_{lo1}]$ | $[\omega_{hi2}, \omega_{lo2}]$ | $[\omega_{hi3}, \omega_{lo3}]$ | $[\omega_{hi4}, \omega_{lo4}]$ | $[\omega_{hi5}, \omega_{lo5}]$ |
| 138 — Brake application | $[B_{hi1}, B_{lo1}]$ | $[B_{hi2}, B_{lo2}]$ | $[B_{hi3}, B_{lo3}]$ | $[B_{hi4}, B_{lo4}]$ | $[B_{hi5}, B_{lo5}]$ |
| 140 — Steering Angle | $[\theta_{hi1}, \theta_{lo1}]$ | $[\theta_{hi2}, \theta_{lo2}]$ | $[\theta_{hi3}, \theta_{lo3}]$ | $[\theta_{hi4}, \theta_{lo4}]$ | $[\theta_{hi5}, \theta_{lo5}]$ |
| 142 — Steering-Wheel Angle | $[\phi_{hi1}, \phi_{lo1}]$ | $[\phi_{hi2}, \phi_{lo2}]$ | $[\phi_{hi3}, \phi_{lo3}]$ | $[\phi_{hi4}, \phi_{lo4}]$ | $[\phi_{hi5}, \phi_{lo5}]$ |
| 143 — Accelerator pedal | $[k_{hi1}, k_{lo1}]$ | $[k_{hi2}, k_{lo2}]$ | $[k_{hi3}, k_{lo3}]$ | $[k_{hi4}, k_{lo4}]$ | $[k_{hi5}, k_{lo5}]$ |
| FFT bin 1 | $[P_{1hi1}, P_{1lo1}]$ | $[P_{1hi2}, P_{1lo2}]$ | $[P_{1hi3}, P_{1lo3}]$ | $[P_{1hi4}, P_{1lo4}]$ | $[P_{1hi5}, P_{1lo5}]$ |
| 146 — FFT bin 2 | $[P_{2hi1}, P_{2lo1}]$ | $[P_{2hi2}, P_{2lo2}]$ | $[P_{2hi3}, P_{2lo3}]$ | $[P_{2hi4}, P_{2lo4}]$ | $[P_{2hi5}, P_{2lo5}]$ |
| ⋮ | ⋮ | ⋮ | ⋮ | ⋮ | ⋮ |
| 148 — RSS | $[S_{hi1}, S_{lo1}]$ | $[S_{hi2}, S_{lo2}]$ | $[S_{hi3}, S_{lo3}]$ | $[S_{hi4}, S_{lo4}]$ | $[S_{hi5}, S_{lo5}]$ |

FIG. 3B

| Parameter | | | | | |
|---|---|---|---|---|---|
| 126—Position | $[X_1, Y_1]$ | $[X_2, Y_2]$ | $[X_3, Y_3]$ | $[X_4, Y_4]$ | $[X_5, Y_5]$ |
| 130—Speed | $[V_{hi1}, V_{lo1}]$ | $[V_{hi2}, V_{lo2}]$ | $[V_{hi3}, V_{lo3}]$ | $[V_{hi4}, V_{lo4}]$ | $[V_{hi5}, V_{lo5}]$ |
| 132—Acceleration | $[A_{hi1}, A_{lo1}]$ | $[A_{hi2}, A_{lo2}]$ | $[A_{hi3}, A_{lo3}]$ | $[A_{hi4}, A_{lo4}]$ | $[A_{hi5}, A_{lo5}]$ |
| 134—Heading | $[\psi_{hi1}, \psi_{lo1}]$ | $[\psi_{hi2}, \psi_{lo2}]$ | $[\psi_{hi3}, \psi_{lo3}]$ | $[\psi_{hi4}, \psi_{lo4}]$ | $[\psi_{hi5}, \psi_{lo5}]$ |
| 135—Yaw Rate | $[\omega_{hi1}, \omega_{lo1}]$ | $[\omega_{hi2}, \omega_{lo2}]$ | $[\omega_{hi3}, \omega_{lo3}]$ | $[\omega_{hi4}, \omega_{lo4}]$ | $[\omega_{hi5}, \omega_{lo5}]$ |
| 138—Brake application | $[B_{hi1}, B_{lo1}]$ | $[B_{hi2}, B_{lo2}]$ | $[B_{hi3}, B_{lo3}]$ | $[B_{hi4}, B_{lo4}]$ | $[B_{hi5}, B_{lo5}]$ |
| 140—Steering Angle | $[\theta_{hi1}, \theta_{lo1}]$ | $[\theta_{hi2}, \theta_{lo2}]$ | $[\theta_{hi3}, \theta_{lo3}]$ | $[\theta_{hi4}, \theta_{lo4}]$ | $[\theta_{hi5}, \theta_{lo5}]$ |
| 142—Steering-Wheel Angle | $[\phi_{hi1}, \phi_{lo1}]$ | $[\phi_{hi2}, \phi_{lo2}]$ | $[\phi_{hi3}, \phi_{lo3}]$ | $[\phi_{hi4}, \phi_{lo4}]$ | $[\phi_{hi5}, \phi_{lo5}]$ |
| 143—Accelerator pedal | $[k_{hi1}, k_{lo1}]$ | $[k_{hi2}, k_{lo2}]$ | $[k_{hi3}, k_{lo3}]$ | $[k_{hi4}, k_{lo4}]$ | $[k_{hi5}, k_{lo5}]$ |
| 146—FFT bin 1 | $[P_{1hi1}, P_{1lo1}]$ | $[P_{1hi2}, P_{1lo2}]$ | $[P_{1hi3}, P_{1lo3}]$ | $[P_{1hi4}, P_{1lo4}]$ | $[P_{1hi5}, P_{1lo5}]$ |
| FFT bin 2 | $[P_{2hi1}, P_{2lo1}]$ | $[P_{2hi2}, P_{2lo2}]$ | $[P_{2hi3}, P_{2lo3}]$ | $[P_{2hi4}, P_{2lo4}]$ | $[P_{2hi5}, P_{2lo5}]$ |
| ... | ... | ... | ... | ... | ... |
| 148—RSS | $[S_{hi1}, S_{lo1}]$ | $[S_{hi2}, S_{lo2}]$ | $[S_{hi3}, S_{lo3}]$ | $[S_{hi4}, S_{lo4}]$ | $[S_{hi5}, S_{lo5}]$ |

FIG. 3C

DETECTING VEHICLE PRESENCE AT A SITE

BACKGROUND

The Global Positioning System (GPS) is a global navigation satellite system. The satellites broadcast time and geolocation data. GPS receivers with an unobstructed line of sight to at least three of the satellites can determine a user's position, i.e., latitude and longitude. Many vehicles are equipped with GPS receivers and rely on GPS to determine their positions.

There are situations in which GPS is insufficient to determine a position of a vehicle in a timely manner In urban or mountainous environments, obstructions sometimes block lines of sight from a vehicle to all but fewer than four satellites.

BRIEF DESCRIPTION OF THE DRAWINGS

FIG. 3A is a diagram of an exemplary ordered sequence of ranges of parameters of a vehicle with a selected subset at a first location along the ordered sequence.

FIG. 3B is a diagram of the ordered sequence with the selected subset at a second location along the ordered sequence.

FIG. 3C is a diagram of the ordered sequence with the selected subset at a third location along the ordered sequence.

DETAILED DESCRIPTION

Figure 1:
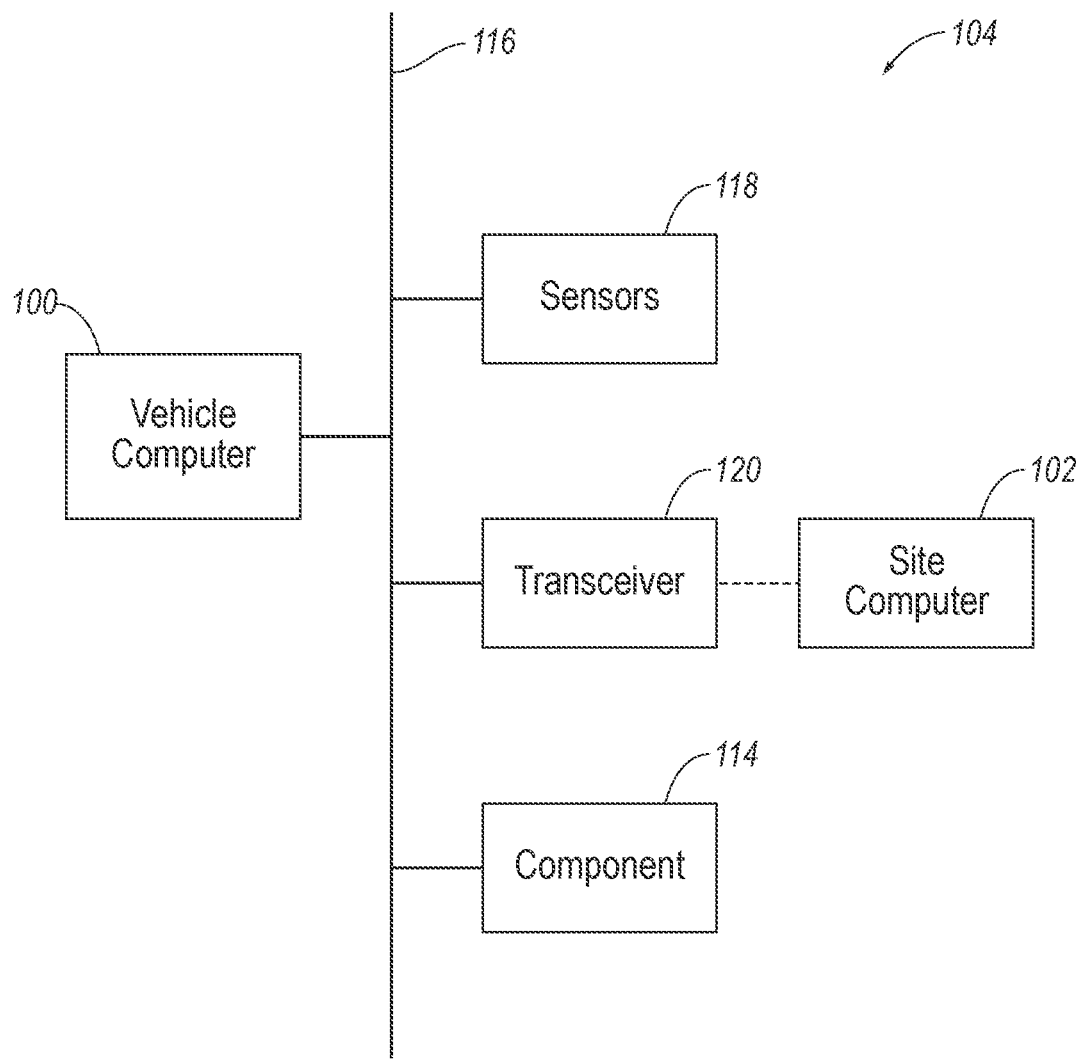
FIG. 1 is a block diagram of elements of an example vehicle.

The system described herein provides a real-time way to determine that a vehicle is present at a site, e.g., by taking an ingress or egress route to or from a road. This determination can be done faster than processing GPS information, which requires tracking vehicle movement over time to achieve a sufficiently high confidence level. The greater speed can improve vehicle operation, e.g., when using the determination to actuate a component such as lifting a gate at an entrance of the site or to provide to an application such as a mapping application. Furthermore, the determination can be performed in environments where GPS is inaccessible or intermittently accessible, such as mountainous or urban environments.

A computer includes a processor and a memory storing instructions executable by the processor to determine that a vehicle is present at a site based on a comparison of sequentially received values for a plurality of parameters indicating movement of the vehicle with an ordered sequence of ranges for the parameters, and perform an operation upon determining that the vehicle is present at the site.

The operation may be actuating a component.

The parameters may include at least one vehicle-dynamics parameter. The at least one vehicle-dynamics parameter may include at least one of speed, acceleration, or heading.

The parameters may include at least one vehicle-control parameter. The at least one vehicle-control parameter may include at least one of brake application, steering-wheel angle, or steering angle.

The parameters may include at least one radio-signal parameter. The at least one radio-signal parameter may include at least one of radio frequency signature or received signal strength.

Determining that the vehicle is present at the site may be performed in response to receiving data indicating that the vehicle entered a geo-fenced area.

Determining that the vehicle is present at the site may be performed in response to receiving a message via short-range radio communication.

Determining that the vehicle is present at the site may be performed in response to receiving a request from a mapping application.

The comparison may include tracking a number of matches between the values and the ranges in a selected subset of the ordered sequence of the ranges, and each match may occur when a most recent of the values for one of the parameters is within one of the ranges in the selected subset for the same parameter. The comparison may include shifting the selected subset along the ordered sequence of the ranges in response to a most recent of the values for one of the parameters is within the range for the same parameter that is next after the selected subset along the ordered sequence of the ranges. Determining that the vehicle is present at the site may be based at least on the selected subset shifting to final ranges along the ordered sequence of the ranges.

The comparison may include calculating a confidence score based at least on the number of the matches, and determining that the vehicle is present at the site may include determining that the confidence score is greater than a threshold score. The instructions may further include instructions to determine that the vehicle is absent from the site in response to the confidence score staying below the threshold score for a threshold time since beginning tracking the number of the matches.

The selected subset may include at least one of the ranges for each parameter, and the selected subset may include the same number of the ranges for each parameter.

A method includes determining that a vehicle is present at a site based on a comparison of sequentially received values for a plurality of parameters related to the vehicle with an ordered sequence of ranges for the parameters, and performing an operation upon determining that the vehicle is present at the site.

The comparison may include tracking a number of matches between the values and the ranges in a selected subset of the ordered sequence of the ranges, and each match may occur when a most recent of the values for one of the parameters is within one of the ranges in the selected subset for the same parameter.

Determining that the vehicle is present at the site may be performed in response to receiving data indicating that the vehicle entered a geo-fenced area.

With reference to the Figures, one or both of a vehicle computer 100 and a site computer 102 includes a processor and a memory storing instructions executable by the processor to determine that a vehicle 104 is present at a site 106 based on a comparison of sequentially received values for a plurality of parameters 108 related to the vehicle 104 with an ordered sequence 110 of ranges 112 for the parameters 108, and perform an operation upon determining that the vehicle 104 is present at the site 106. The parameters 108 can be, e.g., speed 130 of the vehicle 104, heading 134 of the vehicle 104, steering angle 142 of the vehicle 104, radio frequency signature 146 picked up by the vehicle 104 as the vehicle 104 moves through the environment, etc. Each ordered sequence 110 of ranges 112 of parameters 108 is specific to a particular path 124 into the site 106. When two or more of the sequentially received values for the plurality of parameters 108 fall within the ranges 112 in the order of the ordered sequence 110, the vehicle computer 100 or site computer 102 can determine that the vehicle 104 has entered and is at the site 106. Performing the operation can be actuating a component 114, 115. The component 114, 115 can be a component 114 of the vehicle 104 or a component 115 of the site 106 that is useful or necessary to actuate upon the vehicle 104 entering the site 106, e.g., a gate at the site 106.

With reference to FIG. 1, the vehicle 104 may be any suitable type of automobile, e.g., a passenger or commercial automobile such as a sedan, a coupe, a truck, a sport utility, a crossover, a van, a minivan, a taxi, a bus, etc. The vehicle 104, for example, may be autonomous. In other words, the vehicle 104 may be autonomously operated such that the vehicle 104 may be driven without constant attention from a driver, i.e., the vehicle 104 may be self-driving without human input.

The vehicle computer 100 is a microprocessor-based computing device, e.g., a generic computing device including a processor and a memory, an electronic controller or the like, a field-programmable gate array (FPGA), an application-specific integrated circuit (ASIC), etc. The vehicle computer 100 can thus include a processor, a memory, etc. The memory of the vehicle computer 100 can include media for storing instructions executable by the processor as well as for electronically storing data and/or databases, and/or the vehicle computer 100 can include structures such as the foregoing by which programming is provided. The vehicle computer 100 can be multiple computers coupled together. The vehicle computer 100 is located on board the vehicle 104.

The vehicle computer 100 may transmit and receive data through a communications network 116 such as a controller area network (CAN) bus, Ethernet, WiFi, Local Interconnect Network (LIN), onboard diagnostics connector (OBD-II), and/or by any other wired or wireless communications network. The vehicle computer 100 may be communicatively coupled to sensors 118, a transceiver 120, the component 114, and other components via the communications network 116.

The vehicle 104 includes the sensors 118. The sensors 118 may provide data about operation of the vehicle 104, for example, wheel speed, wheel orientation, and engine and transmission data (e.g., temperature, fuel consumption, etc.). The sensors 118 may detect the position and/or orientation of the vehicle 104. For example, the sensors 118 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 118 may detect the external world, e.g., objects and/or characteristics of surroundings of the vehicle 104, such as other vehicles, road lane markings, traffic lights and/or signs, pedestrians, etc. For example, the sensors 118 may include radar sensors, scanning laser range finders, light detection and ranging (LIDAR) devices, and image processing sensors such as cameras.

The vehicle 104 includes the transceiver 120. The transceiver 120 may be adapted to transmit signals wirelessly through any suitable wireless communication protocol, such as Bluetooth®, WiFi, IEEE 802.11a/b/g, other RF (radio frequency) communications, etc. The transceiver 120 may be adapted to communicate with a remote server, that is, a server distinct and spaced from the vehicle 104. The remote server may be located outside the vehicle 104. For example, the remote server may be associated with another vehicle (e.g., V2V communications), an infrastructure component (e.g., V2I communications via Dedicated Short-Range Communications (DSRC) or the like), an emergency responder, a mobile device associated with the owner of the vehicle 104, etc. In particular, the remote server can be the site computer 102. The transceiver 120 may be one device or may include a separate transmitter and receiver.

The vehicle 104 includes the component 114. The component 114 is actuatable by an instruction from the vehicle computer 100 through the communications network 116. For the vehicle 104, the component 114 can be, e.g., windows actuatable to roll up or down, the transceiver 120 to transmit a message such as an entry code, etc.

Figure 2:
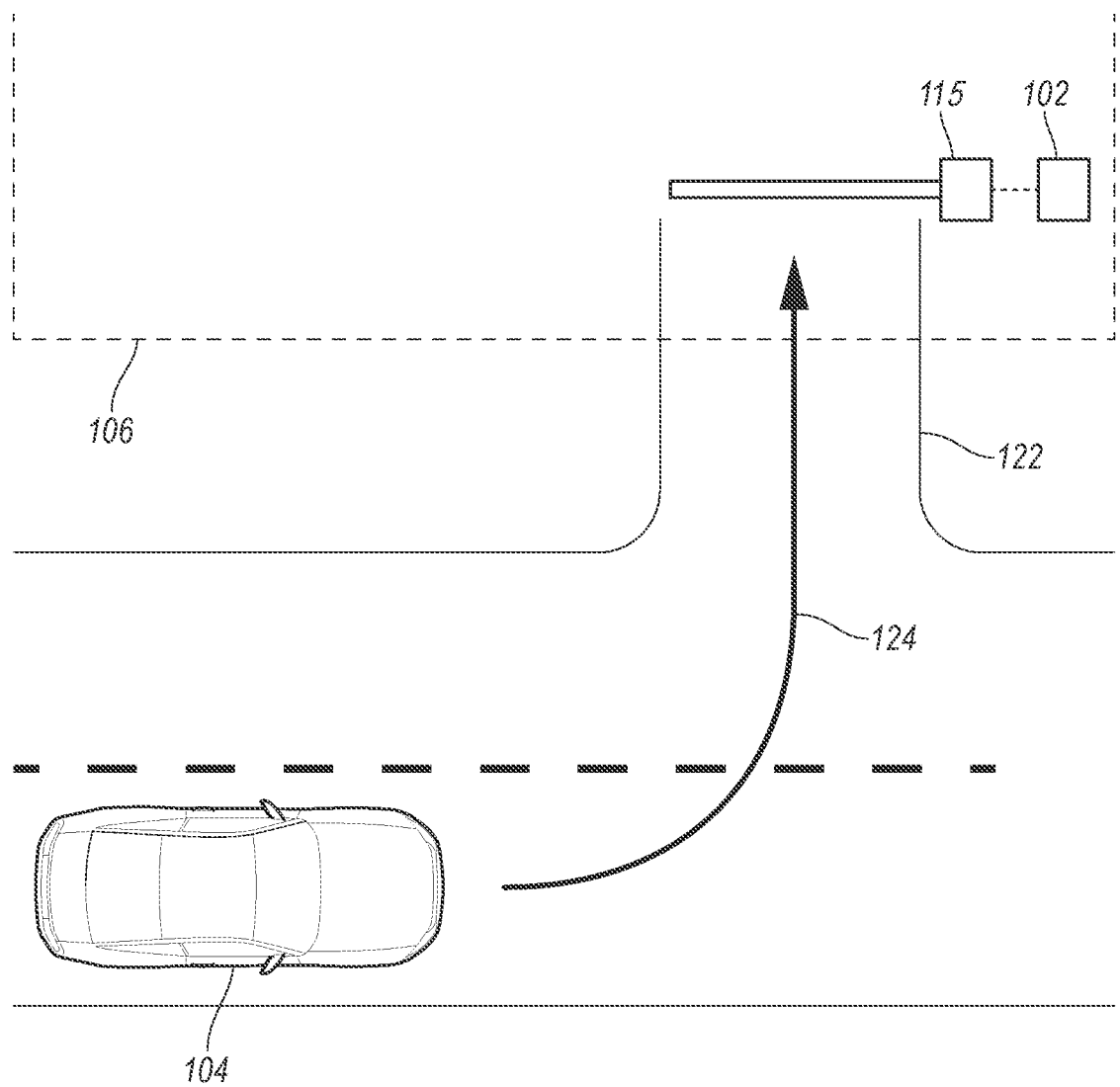
FIG. 2 is a diagram of a vehicle arriving at an example site.

With reference to FIG. 2, the site 106 is a geographic area that the vehicle 104 can enter or exit. The site 106 can be a place where the vehicle 104 will remain parked, e.g., a parking lot or parking garage, or the site 106 can be a place where the vehicle 104 will travel elsewhere, e.g., a freeway. The site 106 includes one or more pathways 122 for ingress and/or egress into or out of the site 106, e.g., a driveway, a private road, an onramp or offramp, etc. When entering or exiting the site 106, the vehicle 104 travels along a path 124 that goes through the pathway 122.

The site computer 102 is a microprocessor-based computing device, e.g., a generic computing device including a processor and a memory, an electronic controller or the like, a field-programmable gate array (FPGA), an application-specific integrated circuit (ASIC), etc. The site computer 102 can thus include a processor, a memory, etc. The memory of the site computer 102 can include media for storing instructions executable by the processor as well as for electronically storing data and/or databases, and/or the site computer 102 can include structures such as the foregoing by which programming is provided. The site computer 102 can be multiple computers coupled together. The site computer 102 is located at the site 106 or has control over the component 115 at the site 106.

The site 106 includes the component 115. The component 115 is actuatable by the site computer 102. For the site 106, the component 115 can be, e.g., a gate actuatable to lift or lower (as shown in FIG. 2), a door actuatable to open or close, a camera actuatable to read a barcode on the vehicle 104, etc.

With reference to FIGS. 3A-C, the parameters 108 indicate movement of the vehicle 104, i.e., physical measurements of variable quantities that vary predictably with operation or movement of the vehicle 104, either a physical measurement describing operation of the vehicle 104, e.g., speed 130, steering angle 142, etc., or a physical measurement varying predictably with movement of the vehicle 104. The parameters 108 are chosen to be quantities that vary in a recognizable manner as the vehicle 104 travels along the path 124, which as described below permits a determination that the vehicle 104 has followed the path 124 and is present at the site 106. As described below, by determining that the vehicle 104 is present at the site 106 using the parameters 108, either the vehicle computer 100 or the site computer 102 can perform the operation. The parameters 108 can describe the operation or characteristics of the vehicle 104, and/or the parameters 108 can be characteristics of the environment that vary in a consistent manner as the vehicle 104 travels along the path 124.

The parameters 108 can include one or more vehicle-position parameters. The vehicle-position parameters can include a position 126, e.g., a last known global position as determined from GPS data or a local position determined by, e.g., triangulation from nearby transmitters. The position 126 can be expressed as a coordinate, i.e., an ordered pair of distances along respective dimensions from an absolute or local origin point.

The parameters 108 include at least one vehicle-dynamics parameter 128. For the purposes of this disclosure, a "vehicle-dynamics parameter" is defined as a parameter 108 describing a characteristic of motion of the vehicle 104. The vehicle-dynamics parameters 128 include at least one of speed 130, acceleration 132, or heading 134. The speed 130 can be expressed as a scalar number in units of distance per time, e.g., miles per hour. The acceleration 132 can be expressed as a scalar number in units of distance per time squared, e.g., m/s$^2$. The heading 134 can be expressed as an angle measured clockwise from due north, e.g., in degrees. The vehicle-dynamics parameters 128 can also include rate of altitude change, jerk, pitch rate, yaw rate 135, etc.

The parameters 108 include at least one vehicle-control parameter 136. For the purposes of this disclosure, a "vehicle-control parameter" is defined as a parameter 108 describing a state of a control for operating the vehicle 104. The vehicle-control parameters 136 include at least one of brake application 138, steering-wheel angle 140, or steering angle 142. The brake application 138 can be expressed as a binary variable with 1 representing that the brakes are applied and 0 representing that the brakes are not applied, or alternatively with further gradations representing a force with which the brakes are applied. The steering-wheel angle 140 is an angle that a steering wheel of the vehicle 104 has been rotated from dead center, e.g., in degrees. The steering angle 142 is an angle that front wheels of the vehicle 104 have been turned from straight ahead, e.g., in degrees. The vehicle-control parameters 136 can also include a gear of a transmission of the vehicle 104 (e.g., first, second, third, neutral, reverse, etc.), an accelerator pedal position 143, a mode of operation of the transmission (sport mode, eco mode, etc.), etc.

The parameters 108 include at least one radio-signal parameter 144. For the purposes of this disclosure, a "radio-signal parameter" is defined as a characteristic of a transmission of radio waves apart from content encoded in the radio waves. The radio-signal parameters 144 can include at least one of radio frequency signature 146 or received signal strength 148. The radio frequency signature 146 is a power for each of a plurality of subparts of a frequency range. For example, the frequency range can be 88 MHz to 108 MHz divided into four subparts or bins, 88-93 MHz, 93-98 MHz, 98-103 MHz, and 103-108 MHz, with power for each subpart in, e.g., watts. The power for each subpart can be a different parameter 108. The received signal strength 148 can be the power, e.g., in watts, of a channel, with the channel represented as a central frequency and a bandwidth.

The vehicle computer 100 and/or the site computer 102 can receive values sequentially over time for the various parameters 108. The values can be measured by the sensors 118. As will be understood, values for different parameters 108 can be updated at the same or different rates, depending on the characteristics of the sensors 118 measuring the parameters 108.

Each range 112 is a space in which the value of one of the parameters 108 is expected to be, e.g., for a one-dimensional parameter 108, a pair of values for the respective parameter 108 representing an upper bound and a lower bound, at a respective location along the ordered sequence 110. One or more of the ranges 112 and the respective parameters 108 could instead be two-dimensional, three-dimensional, etc. For a one-dimensional parameter 108, each range 112 can be a pair of scalar values for one of the parameters 108 representing an upper bound and a lower bound, e.g., for the speed 103, acceleration 132, heading 134, brake application 138, steering-wheel angle 140, steering angle 142, received signal strength 148, etc. Alternatively, a range 112 can be multidimensional. For example, for the radio frequency signature 146, the range 112 at each location along the ordered sequence 110 can include multiple ranges 112, one for each subpart of the frequency range. For another example, for the position 126, the range 112 can be an area constructed from consecutive coordinates $[X_i, Y_i]$, $[X_{i+1}, Y_{i+1}]$ along the ordered sequence 110, e.g., a rectangle extending along a line from $[X_i, Y_i]$ to $[X_{i+1}, Y_{i+1}]$ and extending a preset distance in both perpendicular directions from the line. The preset distance can be chosen based on a typical variance of vehicles traveling along the path 124 and on a typical width of the pathways 122. A value for the position 126 is within the range 112 for position if that value is within the rectangle.

For each path 124 into a site 106, the memory of the vehicle computer 100 and/or the site computer 102 can store a plurality of the ranges 112 in the ordered sequence 110 for each parameter 108. Each parameter 108 has a same number of ranges 112 as every other parameter 108 for which ranges are stored in the ordered sequence 110. The ordered sequence 110 of the ranges 112 for the parameters 108 follows a typical progression of values of the parameters 108 while the vehicle 104 travels along the path 124.

The values for the ranges 112 can be chosen by collecting values for parameters 108 for a large number of vehicles traveling along the path 124, e.g., with each upper bound of a range 112 for a parameter 108 being, e.g., two standard deviations above the mean and each lower bound being two standard deviations below the mean for the respective parameter 108 at respective points along the path 124. How wide the ranges 112 are (e.g., two standard deviations) can be chosen based on a risk of performing versus not performing the operation in the process 400 below when the vehicle 104 enters the site 106. For example, if the operation is actuating the component 115 that is a gate at the site 106, the width of the ranges 112 can be chosen to require a high likelihood that the vehicle 104 is following the path 124 to minimize a chance that the gate opens to allow in an unauthorized vehicle. For another example, if performing the operation is providing the presence of the vehicle 104 at the site 106 to a mapping application, the width of the ranges 112 can be chosen to merely require that the vehicle 104 is more likely than not following the path 124. Machine learning, e.g., artificial neural networks, can be used to create the ordered sequence 110 of ranges 112 for a path 124 into the site 106, using as training data the collected parameters 108 from the vehicles traveling along the path 124 and collected parameters 108 from vehicles traveling near the site 106 without entering.

Each site 106 can have multiple ordered sequences 110 of ranges 112, one for each path 124 into the site 106. For example, for the site 106 shown in FIG. 2, there can be an ordered sequence 110 of ranges 112 for the path 124 shown of a left turn into the pathway 122, and another ordered sequence 110 for a right turn (not shown) from the opposite direction into the pathway 122.

Figure 4:
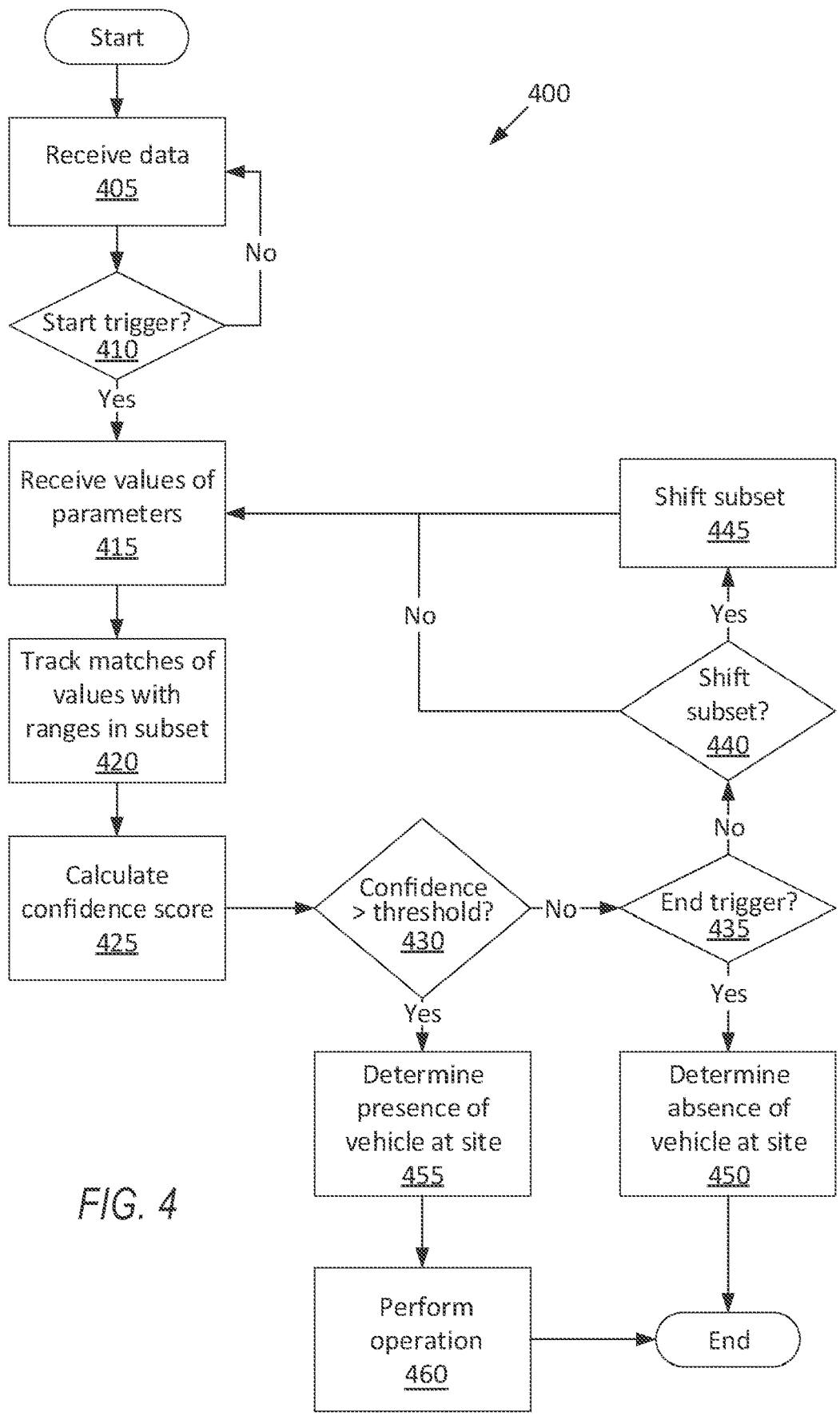
FIG. 4 is a process flow diagram of an example process for determining the presence of the vehicle at the site and performing an operation.

FIG. 4 is a process flow diagram illustrating an exemplary process 400 for determining the presence of the vehicle 104 at the site 106 and performing the operation. The memory of the vehicle computer 100 and/or the site computer 102 stores executable instructions for performing the steps of the process 400 and/or programming can be implemented in structures such as mentioned above. The vehicle computer 100 can perform all of the steps, the site computer 102 can perform all of the steps, or the steps can be split between the vehicle computer 100 and the site computer 102.

As a general overview of the process 400, in response to a starting trigger indicating a possibility that the vehicle 104 will follow the path 124 into the site 106, the vehicle computer 100 or the site computer 102 makes a comparison of the sequentially received values for the parameters 108 with the ordered sequence 110 of the ranges 112 for the parameters 108 for that path 124 into the site 106, and based on the comparison either determines that the vehicle 104 is absent from the site 106 or determines that the vehicle 104 is present at the site 106 and then performs the operation. The comparison includes receiving values of the parameters 108 sequentially over time, tracking matches of those values with the ranges 112 in a selected subset 150 of the ordered sequence 110, and calculating a confidence score, with the selected subset 150 shifting along the ordered sequence 110 (i.e., the new selected subset 150 includes ranges 112 at a next location along the ordered sequence 110 as a previous selected subset 150, as shown in the progression from FIG. 3A to 3B to 3C) as values fall within ranges 112 that are next after the selected subset 150, and with the comparison ending either by the confidence score exceeding a threshold score, indicating that the vehicle 104 is present at the site 106, or by an ending trigger, indicating that the vehicle 104 is absent from the site 106.

The process 400 begins in a block 405, in which the vehicle computer 100 or site computer 102 receives data from the sensors 118 relevant for determining whether one of the starting triggers has occurred in a decision block 410. Relevant to a first starting trigger below, the vehicle computer 100 or site computer 102 can receive GPS data indicating the position 126 of the vehicle 104 from the sensors 118. For example, the site computer 102 can receive the position 126 of the vehicle 104 that is transmitted by the transceiver 120. Relevant to a second starting trigger below, the vehicle computer 100 or site computer 102 can receive a message via short-range radio frequency, e.g., via the transceiver 120 for the vehicle computer 100. The message can state or indicate that the vehicle 104 is in the vicinity of the site 106, and the message may also contain one or more ordered sequences 110 for the site 106. Relevant to a third starting trigger below, the vehicle computer 100 or site computer 102 can receive a request from an application, either running on the same vehicle computer 100 or site computer 102 as the process 400 or communicated from another computer, e.g., a control module on board the vehicle 104 or a mobile device of an occupant or operator of the vehicle 104 in communication via the transceiver 120. The application can be, e.g., a mapping application, an authentication application for the site 106, etc.

Next, in the decision block 410, the vehicle computer 100 or site computer 102 determines whether one of the starting triggers has occurred. The starting triggers are chosen to indicate that the vehicle 104 has a possibility of entering the site 106. If one of the starting triggers described in more detail below has occurred, the process 400 proceeds to a block 415. If none of the starting triggers has occurred, the process 400 returns to the block 405 to continue monitoring data for the starting triggers.

A first starting trigger can be receiving data indicating that the vehicle 104 entered a geo-fenced area. A geo-fenced area is a localized geographic area enclosed by a virtual boundary or by offsets from a predefined point. The virtual boundary or offsets can be stored in the memory of the vehicle computer 100 or site computer 102, e.g., as map data. The virtual boundary can be transmitted from the site computer 102 to the vehicle computer 100 when the vehicle 104 is within range of a transmitter of the site 106. The geo-fenced area is larger than the site 106 and encompasses the site 106. The virtual boundary can be chosen to indicate that the vehicle 104 is in the vicinity of the site 106. The virtual boundary can be chosen to accommodate that the position 126 as received from GPS sensors can have a larger-than-typical uncertainty. The vehicle 104 is determined to be in the geo-fenced area if the position 126 is inside the virtual boundary.

A second starting trigger can be receiving a message via short-range radio communication, e.g., a V2X message. The message can be sent from the site 106 to the vehicle 104 or from the vehicle 104 to the site 106. Because the message is sent via short-range radio communication, the vehicle 104 can be inferred to be near the site 106. The message from the site 106 to the vehicle 104 can include the ordered sequences 110 of ranges 112 for the site 106. The message can include a handshake protocol.

A third starting trigger can be a request from an application such as a mapping application. The mapping application can be running on the vehicle computer 100 or on a mobile device in communication with the vehicle computer 100 via the transceiver 120. The request can include the ordered sequences 110 of ranges 112 for the site 106. Alternatively, the application can be an authentication application, e.g., for granting access to the site 106.

In the block 415, the vehicle computer 100 or site computer 102 receives the most recent values for the parameters 108. The vehicle computer 100 can receive the values from the sensors 118 via the communications network 116. The site computer 102 can receive the values via a message sent from the transceiver 120 of the vehicle 104. Alternatively or additionally, the site computer 102 can receive the radio-signal parameters 144 from a radio receiver of the site 106.

Next, in a block 420, the vehicle computer 100 or site computer 102 tracks a number of matches between the values and the ranges 112 in a selected subset 150 of the ordered sequence 110 of the ranges 112. The selected subset 150 includes the ranges 112 for all the parameters 108 at one or more consecutive locations along the ordered sequence 110. The selected subset 150 thus includes at least one range 112 for each parameter 108 and includes the same number of the ranges 112 for each parameter 108. For example, as shown in FIG. 3A, the selected subset 150 includes the ranges 112 in the first and second locations along the ordered sequence 110 for each parameter 108; as shown in FIG. 3B, the selected subset 150 includes the ranges 112 in the second and third locations; and as shown in FIG. 3C, the selected subset 150 includes the ranges 112 in the third and fourth locations. Each match occurs when a most recent of the values for one of the parameters 108 is within one of the ranges 112, e.g., is between the upper bound and lower bound for that range 112, in the selected subset 150 for the same parameter 108. Each range 112 can account for at most one match; i.e., if newer values for the parameter 108 continue to be within the same range 112 at the same location along the ordered sequence 110, then still one match has occurred.

Next, in a block 425, the vehicle computer 100 or site computer 102 calculates a confidence score. The confidence score can be based at least on the number of matches. For example, the confidence score can simply be the number of matches. Alternatively or additionally, the confidence score can measure how close each value responsible for a match was to a midpoint of the respective range 112, e.g., a point halfway between the upper bound and lower bound for that range 112. Alternatively or additionally, the confidence score can take into account how far the selected subset 150 has shifted along the ordered sequence 110, as described below with respect to a block 445. For example, the confidence score can be the most-advanced location of the selected subset 150 along the ordered sequence 110, e.g., 2 for FIG. 3A, 3 for FIG. 3B, 4 for FIG. 3C, etc. Alternatively or additionally, the confidence score can take into account different weights assigned to each parameter 108. The weights can be chosen according to how unique the ranges 112 for that parameter 108 are for that path 124, i.e., how comparatively predictive matching the ranges 112 are that the vehicle 104 is following the path 124. For example, the confidence score can be $C=\Sigma^{N}_{i=1}w_{i}j_{i}$, in which C is the confidence score, i is an index of the parameters 108, N is the total number of parameters 108, $w_i$ is the weight of parameter i, and $j_i$ is the number of ranges 112 of parameter i for which a match has occurred.

Next, in a decision block 430, the vehicle computer 100 or site computer 102 determines whether the confidence score is greater than a threshold score. The threshold score can be chosen to indicate a high likelihood that the vehicle 104 is following the path 124, e.g., at least a 95% probability. If the confidence score is the location of the selected subset 150 along the ordered sequence 110, then the threshold score can indicate that the selected subset 150 has shifted to the final ranges 112, i.e., the last location, along the ordered sequence 110 of ranges 112. If the confidence score is higher than the threshold score, the process 400 proceeds to a block 455. If the confidence score is lower than the threshold score, the process 400 proceeds to a decision block 435.

In the decision block 435, the vehicle computer 100 or site computer 102 determines whether an ending trigger has occurred. The ending triggers are chosen to indicate that the vehicle 104 has not followed the path 124. A first ending trigger can be that the vehicle 104 exited the geo-fenced area of the first starting trigger of the decision block 410. A second ending trigger can be that the vehicle 104 is out of range of the source of the short-range radio frequency message of the second starting trigger of the decision block 410. A third ending trigger is a threshold time having elapsed since the starting trigger, indicating that the confidence score has stayed below the threshold score for the threshold time since beginning tracking the number of matches. The threshold time can be chosen as a time in which the vehicle 104 typically would have completed following the path 124. If one of the ending triggers has occurred, the process 400 proceeds to a block 450. If none of the ending triggers has occurred, the process 400 proceeds to a decision block 440.

In the decision block 440, the vehicle computer 100 or site computer 102 determines whether to shift the selected subset 150 along the ordered sequence 110 of the ranges 112. For example, whether to shift the selected subset 150 depends on whether a most recent value is within the range 112 for the same parameter 108 that is next after the selected subset 150 along the ordered sequence 110 of the ranges 112. For example, with the selected subset 150 as shown in FIG. 3A, if a most recent value of the heading 134 is between who and 110з, then the selected subset 150 should shift. For another example, whether to shift the selected subset 150 can depend on a minimum number, e.g., two, of most recent values being within the ranges 112 for the respective parameters 108 that are next after the selected subset 150 along the ordered sequence 110 of ranges 112. For another example, whether to shift the selected subset 150 can depend on whether a most recent value is within the range 112 for one of a subset of the parameters 108 that is next after the selected subset 150 along the ordered sequence 110 of the ranges 112. The subset of parameters 108 can be chosen according to how powerful the ranges 112 for those parameters 108 are for predicting that the vehicle 104 is following that path 124, i.e., how comparatively predictive matching the ranges 112 are that the vehicle 104 is following the path 124, which can be determined by, e.g., a linear regression of the matching of the parameters 108 to the respective ranges 112. If the selected subset 150 should shift, the process 400 proceeds to a block 445. If the selected subset 150 should remain in the same location, the process 400 returns to the block 415 to continue receiving values for the parameters 108 and tracking additional matches.

In the block 445, the vehicle computer 100 or site computer 102 shifts the selected subset 150 along the ordered sequence 110 of the ranges 112. The shifting can follow a preset progression of shifts, e.g., from the location in FIG. 3A to the location in FIG. 3B and then from the location in FIG. 3B to the location in FIG. 3C. The preset progression of shifts can also include changing a width of the selected subset 150, i.e., how many consecutive locations along the ordered sequence 110 the selected subset 150 covers. In FIGS. 3A-C, the selected subset 150 covers two locations along the ordered sequence 110, but at some points along the preset progression of shifts, the selected subset 150 could cover one or three locations, for example. The changing of the width of the selected subset 150 can reflect an increase or decrease of the variability of how vehicles typically follow the path 124 at those locations along the ordered sequence 110. After the block 445, the process 400 returns to the block 415 to continue receiving values for the parameters 108 and tracking additional matches.

In the block 450, i.e., after an ending trigger has occurred in the decision block 435, the vehicle computer 100 or site computer 102 determines that the vehicle 104 is absent from the site 106. The determination that the vehicle 104 is absent can be sent to, e.g., the source of the short-range radio frequency message of the second starting trigger or the mapping application of the third starting trigger of the decision block 410, if applicable. After the block 450, the process 400 ends.

In the block 455, i.e., after the confidence score has exceeded the threshold score in the decision block 430, the vehicle computer 100 or site computer 102 determines that the vehicle 104 is present at the site 106.

Next, in a block 460, the vehicle computer 100 or site computer 102 performs the operation, e.g., actuates the component 114, 115 or providing confirmation that the vehicle 104 is at the site 106 to an application. For example, the component 115 can be a gate at the site 106, and the site computer 102 can actuate the lift gate to open and permit the vehicle 104 to pass through, perhaps after checking for authorization information from the vehicle 104. For another example, the component 114 can be the windows of the vehicle 104, and the vehicle computer 100 can actuate the windows to close, e.g., if the site 106 is a freeway. For yet another example, the operation can be providing confirmation that the vehicle 104 is at the site 106 to the application responsible for the third starting trigger, e.g., a mapping application or an authentication application of the site 106. The mapping application can use the confirmation for tracking the location of the vehicle 104 while, e.g., providing navigation directions. After the block 460, the process 400 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
  determine that a vehicle is present at a site based on a comparison of sequentially received values for a plurality of parameters indicating movement of the vehicle with an ordered sequence of ranges for the parameters, each range including at least one upper bound and at least one lower bound for the respective parameter, the ordered sequence of ranges being prestored in the memory, the ordered sequence of ranges corresponding to one of an ingress route entering into the site or an egress route exiting out of the site; and
  actuate a component upon determining that the vehicle is present at the site.

2. The computer of claim 1, wherein determining that the vehicle is present at the site is performed in response to receiving data indicating that the vehicle entered a geofenced area.

3. The computer of claim 1, wherein determining that the vehicle is present at the site is performed in response to receiving a message via short-range radio communication.

4. The computer of claim 1, wherein determining that the vehicle is present at the site is performed in response to receiving a request from a mapping application.

5. The computer of claim 1, wherein the site is a predetermined site, and the ordered sequence of ranges is associated with the predetermined site in the memory.

6. The computer of claim 1, wherein the instructions further include instructions to determine that the vehicle is absent from the site based on the comparison of the sequentially received values for the parameters with the ordered sequence of ranges, and refrain from performing the operation upon determining that the vehicle is absent from the site.

7. The computer of claim 1, wherein the instructions further include instructions to actuate mechanical movement of the component upon determining that the vehicle is present at the site.

8. The computer of claim 1, wherein the instructions further include instructions to determine that the vehicle is present at the site based on the sequentially received values matching at least one of a plurality of ordered sequences of ranges for the parameters, the ordered sequences of ranges being specific to different respective routes into or out of the site.

9. The computer of claim 1, wherein the parameters include at least one vehicle-dynamics parameter.

10. The computer of claim 9, wherein the at least one vehicle-dynamics parameter includes at least one of speed, acceleration, or heading.

11. The computer of claim 1, wherein the parameters include at least one vehicle-control parameter.

12. The computer of claim 11, wherein the at least one vehicle-control parameter includes at least one of brake application, steering-wheel angle, or steering angle.

13. The computer of claim 1, wherein the parameters include at least one radio-signal parameter.

14. The computer of claim 13, wherein the at least one radio-signal parameter includes at least one of radio frequency signature or received signal strength.

15. The computer of claim 1, wherein the comparison includes tracking a number of matches between the values and the ranges in a selected subset of the ordered sequence of the ranges, wherein each match occurs when a most recent of the values for one of the parameters is within one of the ranges in the selected subset for the same parameter.

16. The computer of claim 15, wherein the comparison includes shifting the selected subset along the ordered sequence of the ranges in response to a most recent of the values for one of the parameters is within the range for the same parameter that is next after the selected subset along the ordered sequence of the ranges.

17. The computer of claim 16, wherein determining that the vehicle is present at the site is based at least on the selected subset shifting to final ranges along the ordered sequence of the ranges.

18. The computer of claim 15, wherein the comparison includes calculating a confidence score based at least on the number of the matches, and determining that the vehicle is present at the site includes determining that the confidence score is greater than a threshold score.

19. The computer of claim 18, wherein the instructions further include instructions to determine that the vehicle is absent from the site in response to the confidence score staying below the threshold score for a threshold time since beginning tracking the number of the matches.

20. A method comprising:
  determining that a vehicle is present at a site based on a comparison of sequentially received values for a plurality of parameters related to the vehicle with an ordered sequence of ranges for the parameters, each range including at least one upper bound and at least one lower bound for the respective parameter, the ordered sequence of ranges being prestored in a memory, the ordered sequence of ranges corresponding to one of an ingress route entering into the site or an egress route exiting out of the site; and actuating a component upon determining that the vehicle is present at the site.

* * * * *